(12) United States Patent
Yang et al.

(10) Patent No.: US 7,795,057 B2
(45) Date of Patent: Sep. 14, 2010

(54) LIQUID CRYSTAL DISPLAY DEVICE AND FABRICATION METHOD THEREOF

(75) Inventors: Myoung Su Yang, Gunpo (KR); Joon-Young Yang, Bucheon (KR); Jung-Il Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 352 days.

(21) Appl. No.: 11/635,639

(22) Filed: Dec. 8, 2006

(65) Prior Publication Data

US 2007/0148800 A1 Jun. 28, 2007

(30) Foreign Application Priority Data

Dec. 9, 2005 (KR) .................. 10-2005-0120888

(51) Int. Cl.
*H01L 21/00* (2006.01)
(52) U.S. Cl. .................. 438/30; 438/29; 438/149; 257/72
(58) Field of Classification Search .......... 257/72; 349/149, 187; 438/187, 29, 30, 149
See application file for complete search history.

(56) References Cited

U.S. PATENT DOCUMENTS

| 2003/0086046 | A1* | 5/2003 | You .......................... 349/149 |
| 2004/0125327 | A1* | 7/2004 | Choi et al. .................. 349/187 |
| 2004/0129943 | A1* | 7/2004 | Yoo et al. ..................... 257/72 |

\* cited by examiner

*Primary Examiner*—Bradley K Smith
*Assistant Examiner*—Marvin Payen
(74) *Attorney, Agent, or Firm*—Birch, Stewart Kolasch, & Birch LLP

(57) ABSTRACT

A liquid crystal display (LCD) device and its fabrication method includes providing a substrate divided into pixel part and pad parts; forming a gate electrode and a gate line at the pixel part through a first masking process; forming a first insulation film; forming an active pattern and source and drain electrodes at an upper portion of the gate electrode of the pixel part and forming a data line substantially crossing the gate line to define a pixel region through a second masking process; forming a pixel electrode directly electrically connected with the drain electrode at the pixel region of the pixel part through a third masking process; and attaching first and second substrates. A pixel electrode is formed to directly electrically connect with a drain electrode by selectively etching a transparent conductive film without forming a contact hole.

12 Claims, 10 Drawing Sheets

LIQUID CRYSTAL DISPLAY DEVICE AND FABRICATION METHOD THEREOF

This application claims priority under 35 U.S.C. §119 of Korean application no. 10-2005-120888, filed Dec. 9, 2005, the entire contents of which are hereby incorporated by reference.

BACKGROUND OF THE INVENTION

1. Field of the Invention

The invention relates to a liquid crystal display (LCD) device and its fabrication method and, more particularly, to an LCD capable of simplifying the fabrication process and improving the production yield by reducing the number of masks.

2. Description of the Related Art

As the consumer's interest in information displays is growing and the demand for portable, i.e., mobile, information devices increases, research and commercialization of light and thin flat panel displays ("FPD") has increased. Flat panel displays are replacing the Cathode Ray Tube ("CRT"), which is the most common existing display device.

The liquid crystal display ("LCD") is a FPD device for displaying images by exploiting the optical anisotropy of a liquid crystalline material. LCD devices exhibit excellent resolution and color and picture quality, so they are widely applied for notebook computers, desktop monitors, and the like.

An LCD includes a color filter substrate, an array substrate and a liquid crystal layer formed between the color filter substrate and the array substrate.

As switching elements of the LCD, thin film transistors (TFTs) are generally used. As a channel layer of the TFT, an amorphous silicon thin film is used.

The fabrication process of the LCD requires multiple masking processes (namely, photographing processes) to fabricate the array substrate including TFTs, so a method for reducing the number of masking processes is necessary to increase productivity.

The structure of a related art LCD will be described in detail with reference to FIG. 1.

FIG. 1 is an exploded perspective view showing the related art LCD.

As shown in FIG. 1, the LCD includes a color filter substrate 5, an array substrate 10 and a liquid crystal layer 30 formed between the color filter substrate 5 and the array substrate 10.

The color filter substrate 5 includes color filters (C) including multiple sub-color filters 7 implementing red, green and blue colors, black matrices 6 for dividing the sub-color filters 7 and blocking light transmission to the liquid crystal layer 30, and a transparent common electrode 8 for applying voltage to the liquid crystal layer 30.

The array substrate 10 includes multiple gate lines 16 and multiple data lines 17 arranged horizontally and vertically to define multiple pixel regions (P). TFTs, the switching elements, are formed at each crossing of the gate lines 16 and data lines 17, and pixel electrodes 18 formed on each pixel region (P).

The color filter substrate 5 and the array substrate 10 are attached facing each other by a sealant (not shown) formed on an outer edge of an image display region to form a liquid crystal display panel, and the two substrates 5 and 10 are attached by an attachment key (not shown) formed on the color filter substrate 5 or on the array substrate 10.

FIGS. 2A to 2E show sectional views sequentially showing a fabrication process of the related art array substrate of the LCD in FIG. 1.

FIG. 2A shows a gate electrode 21 made of a conductive material that is formed using a photolithography process (a first masking process) on a substrate.

Next, as shown in 2B, a first insulation film 15A, an amorphous silicon thin film and an n+ amorphous silicon thin film are sequentially deposited on the entire surface of the substrate 10 having the gate electrode 21 formed thereon. The amorphous silicon thin film and the n+ amorphous silicon thin film are selectively patterned using photolithography (a second masking process) to form an active pattern 24 formed of the amorphous silicon thin film on the gate electrode 21.

In this case, the n+ amorphous silicon thin film pattern 25, which has been patterned in the same form as the active pattern 24, is formed on the active pattern 24.

FIG. 2C shows that a subsequent a conductive metal material is deposited on the entire surface of the substrate 10 and then is selectively patterned using photolithography (a third masking process) to form a source electrode 22 and a drain electrode 23 at an upper portion of the active pattern 24. At this time, a certain portion of the n+ amorphous silicon thin film pattern formed on the active pattern 24 is removed through the third masking process to form an ohmic-contact layer 25' between the active pattern 24 and the source and drain electrodes 22 and 23.

Subsequently, FIG. 2D shows a second insulation film 15B that is deposited on the entire surface of the substrate 10 with the source electrode 22 and the drain electrode 23 formed thereon, and a portion of the second insulation film 15B is removed using photolithographic processing (a fourth masking process) to form a contact hole 40 exposing a portion of the drain electrode 23.

Finally, as shown in FIG. 2E, a transparent conductive metal material is deposited on the entire surface of the substrate 10 and then is selectively patterned using the photolithographic processing (a fifth masking process) to form a pixel electrode 18 that is electrically connected with the drain electrode 23 via the contact hole 40.

As mentioned above, in fabricating the array substrate that includes the TFTs, a total of at least five photolithographic processes are necessary to pattern the gate electrode, the active pattern, the source and drain electrodes, the contact hole and the pixel electrode.

The photolithography process is a complicated process of transferring a pattern formed on a mask onto the substrate on which a thin film is deposited to form a desired pattern, which includes multiple process steps such as coating a photosensitive solution, exposing, developing, etc. As a result, the multiple photolithographic processes have many problems that degrade the production yield and increases the probability of generating a defective TFT.

In particular, the masks designed for forming the pattern are quite expensive, and as the number of masks applied for the processes increases, the fabrication cost of the LCD proportionally increases.

SUMMARY OF THE INVENTION

Therefore, an object of the invention, in part, is to provide a liquid crystal display (LCD) device capable of reducing the number of masks used for fabricating thin film transistors (TFTs) and its fabrication method.

The invention, in part, pertains to an LCD that is formed of a first substrate divided into a pixel part and a pad part; a gate electrode and a gate line formed at the pixel part of the first substrate and a gate pad line formed at the pad part of the first substrate, the gate electrode, the gate line and the gate pad line being formed of a first conductive film; a first insulation film formed over the first substrate; an active pattern formed at an upper portion of the gate electrode; source and drain electrodes electrically connected with certain regions of the active pattern, a data line substantially crossing the gate line to form a pixel region, and a data pad line formed at the pad part of the first substrate, the source and drain electrodes, the data line and the data pad line being formed of a second conductive film; a second insulation film formed over the first substrate; a pixel electrode electrically connected directly with a portion of the drain electrode, a gate pad electrode electrically connected with the gate pad line, and a data pad electrode electrically connected with the data pad line, the pixel electrode, the gate pad electrode and the data pad electrode being formed of a third conductive film; and a second substrate attached with the first substrate.

The invention, in part, pertains to a method of fabricating an LCD device that includes providing a first substrate divided into a pixel part and a pad part; forming a gate electrode and a gate line at the pixel part of the first substrate through a first masking process; forming a first insulation film over the first substrate; forming an active pattern and source and drain electrodes at an upper portion of the gate electrode of the pixel part and forming a data line substantially crossing the gate line to define a pixel region through a second masking process; forming a pixel electrode electrically connected directly with the drain electrode at the pixel region of the pixel part through a third masking process; and attaching first and second substrates.

The foregoing and other objects, features, aspects and advantages of the invention will become more apparent from the following detailed description of the invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

A liquid crystal display (LCD) and its fabrication method according to exemplary preferred embodiments of the invention will be described with reference to the accompanying drawings.

Figure 1:
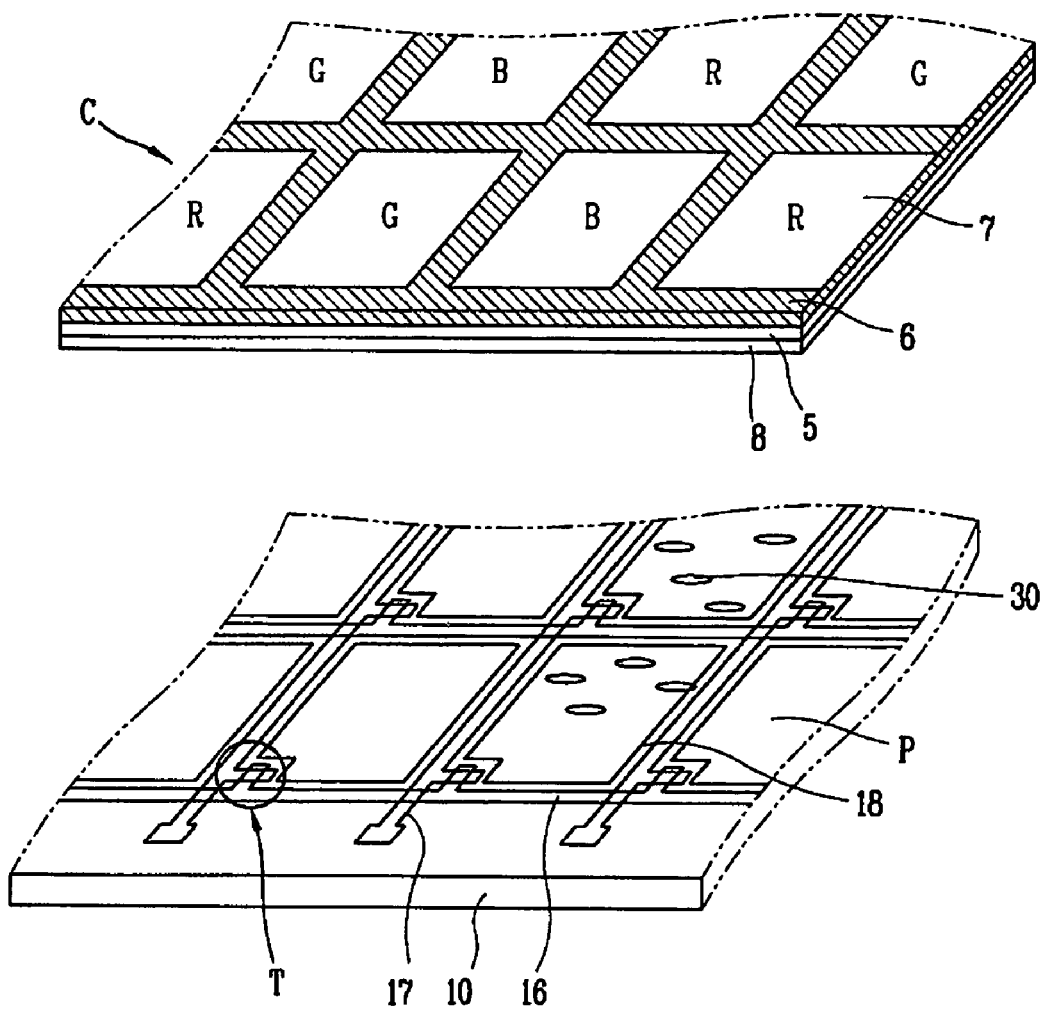
FIG. 1 shows an exploded perspective view of a related art liquid crystal display (LCD)
Figure 2A:
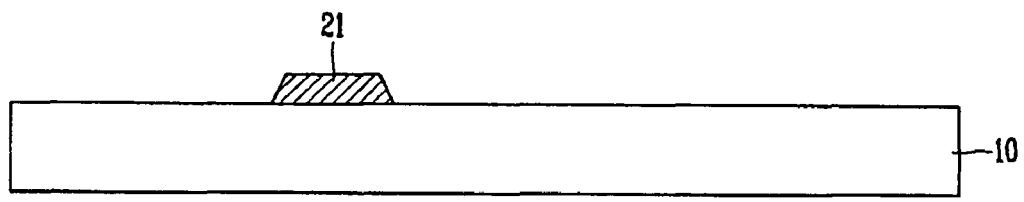
FIGS. 2A to 2E are sectional views sequentially showing a fabrication process of the related art array substrate of the LCD in FIG. 1.
Figure 2B:
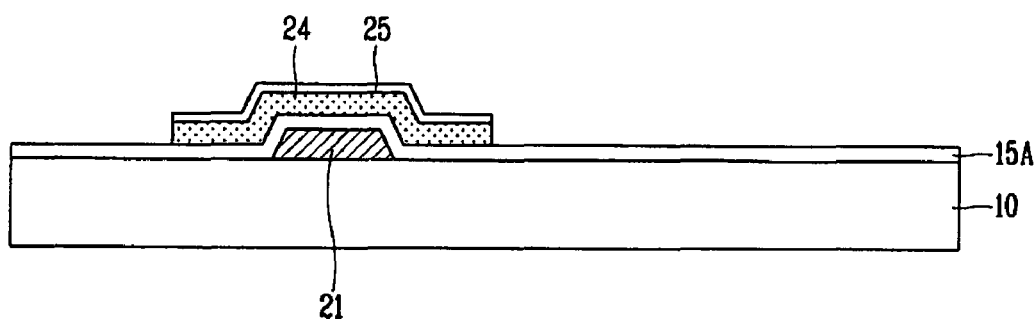
Figure 2C:
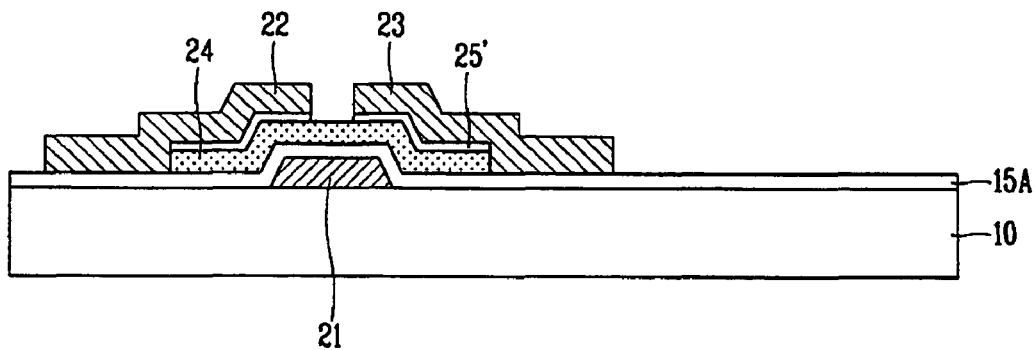
Figure 2D:
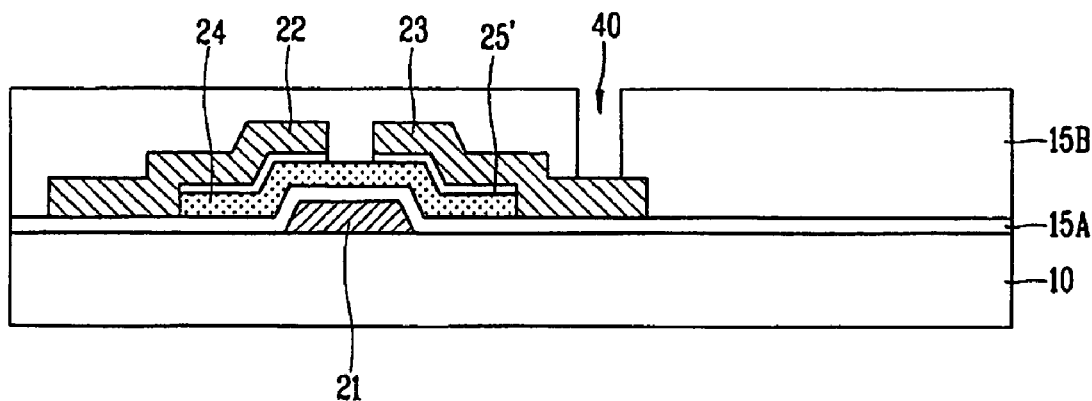
Figure 2E:
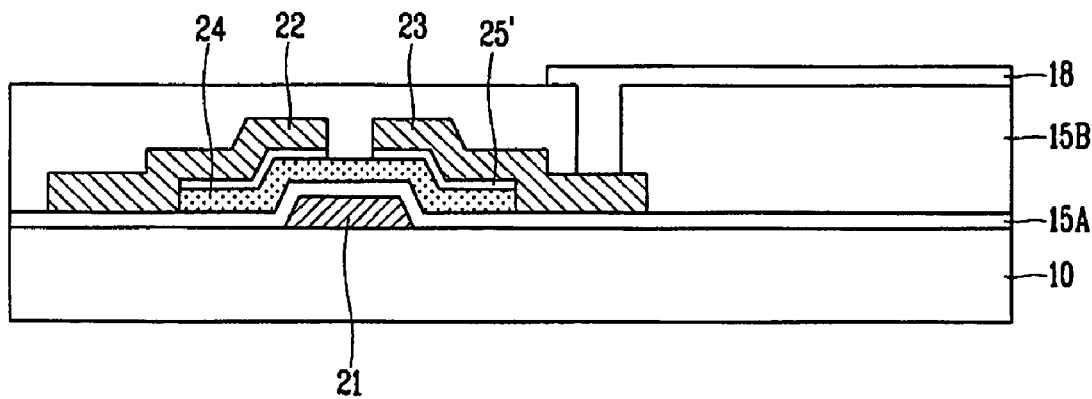
Figure 3:
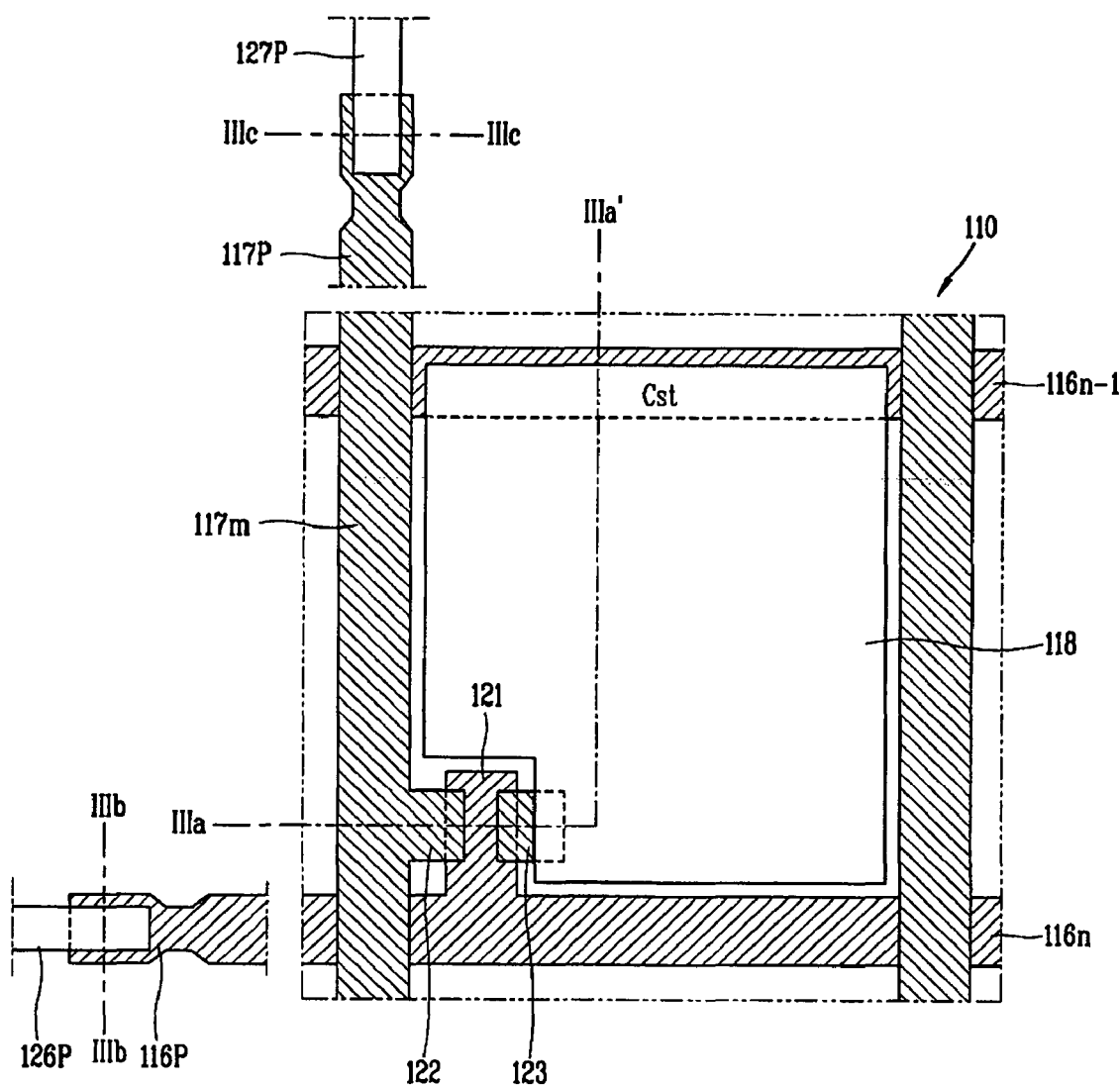
FIG. 3 shows a plan view of a portion of an array substrate of an LCD according to the invention.

FIG. 3 shows a plan view of a portion of an array substrate of an LCD according to the invention, in which a single pixel including a gate pad part and a data pad part are shown.

In the full display, the N number of gate lines and M number of data lines are formed to cross each other to define the M×N number of pixels over an array substrate, and the (m,n)th pixel is shown in FIG. 3 for the sake of brevity.

In FIG. 3, the nth gate line 116$n$ and the mth data line 117$m$ are arranged vertically and horizontally to define the (m,n)th pixel region over an array substrate 110. A thin film transistor (TFT), the switching element, is formed at a crossing of the nth gate line 116$n$ and the mth data line 117$m$. A pixel electrode 118 is connected with the TFT to drive the liquid crystal (not shown). A common electrode of a color filter substrate (not shown) is also formed in the pixel region.

A gate pad electrode 126P and a data pad electrode 127P are formed at an edge portion of the array substrate 110, electrically connected with the nth gate line 116$n$ and the mth data line 117$m$, respectively, and transfer a scan signal and a data signal applied from an external driving circuit unit (not shown) to the nth gate line 116$n$ and the mth data line 117$m$.

That is, the nth gate line 116$n$ and the mth data line 117$m$ extend toward the driving circuit unit to form a gate pad line 116P and a data pad line 117P, respectively, and receive the scan signal and the data signal from the driving circuit unit through the gate pad electrode 126P and the data pad electrode 127P, which are respectively electrically connected with the gate pad line 116P and the data pad line 117P.

The TFT includes a gate electrode 121 connected with the nth gate line 116$n$, a source electrode 122 connected with the mth data line 117$m$, and a drain electrode 123 connected with the pixel electrode 118. In addition, the TFT includes a first insulation film (not shown), for insulating the gate electrode 121 and the source/drain electrodes 122 and 123, and an active pattern 124 (not shown) for forming a conductive channel between the source and drain electrodes 123 by a gate voltage supplied to the gate electrode 121.

In this configuration, a portion of the source electrode 122 is connected with the mth data line 117$m$, forming a portion of the mth data line 117$m$, and a portion of the drain electrode 123 extends toward the pixel electrode 118 so as to directly electrically connect with a portion of the pixel electrode 118.

A portion of the previous gate line, namely, the (n−1)th gate line 116$n$−1, overlaps with a portion of the pixel electrode 118 with the first insulation film interposed therebetween, forming a storage capacitor (Cst). The storage capacitor (Cst) uniformly sustains a voltage applied to a liquid crystal capacitor until the next signal is applied. Namely, the pixel electrode 118 of the array substrate 110 forms the liquid crystal capacitor together with the common electrode of the color filter substrate, and the voltage applied to the liquid crystal capacitor is generally not sustained until the next signal is received, but leaks to disappear. Thus, to sustain the applied voltage, the storage capacitor (Cst) should be connected with the liquid crystal capacitor and be used.

Besides sustaining the signal, the storage capacitor (Cst) stabilizes the gray scale representation and reduces residual image.

The array substrate 110 can be fabricated via a total of three masking processes by selectively etching a transparent conductive film during the process of forming the pixel electrode 118. This will be described in detail as follows.

Figure 4A:
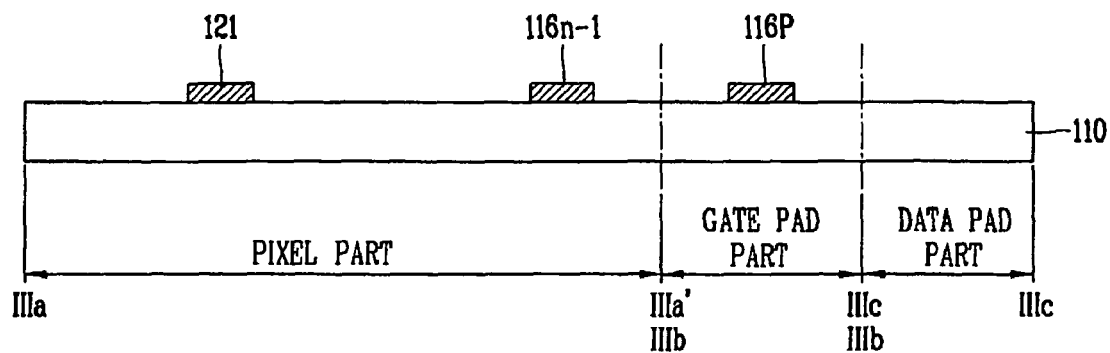
FIGS. 4A to 4C show sectional views sequentially depicting a fabrication process taken along lines IIIa-IIIa', IIIb-IIIb' and IIIc-IIIc' of the array substrate in FIG. 3.
Figure 4B:
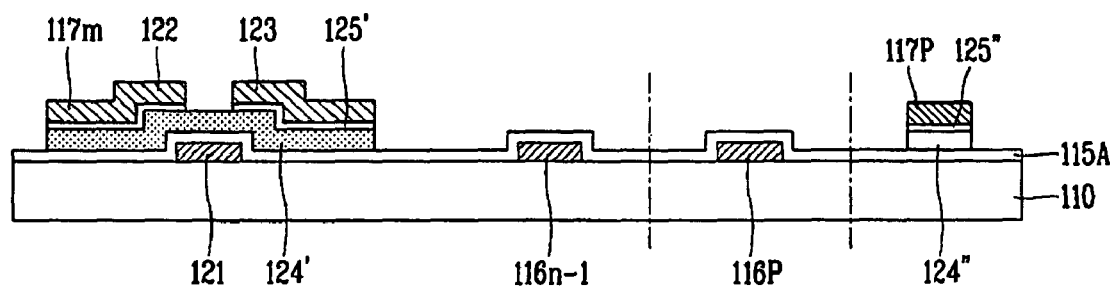
Figure 4C:
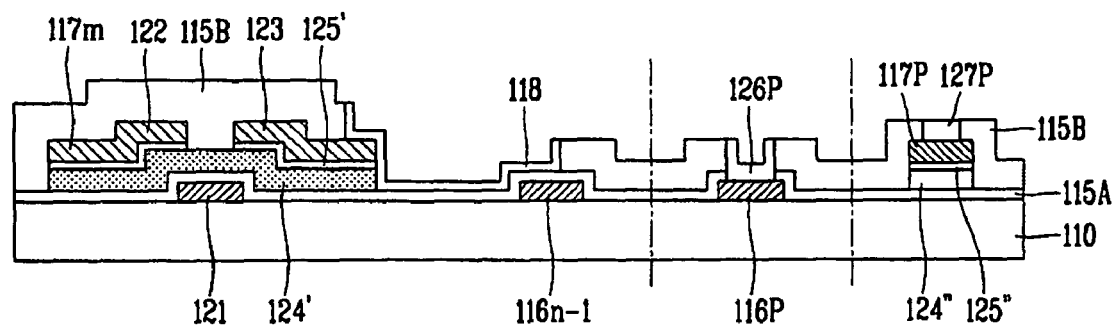

FIGS. 4A to 4C are sectional views sequentially showing a fabrication process of the array substrate in FIG. 3, in which the left side shows a process for fabricating the array substrate of the pixel part and the right side sequentially shows a process of fabricating the array substrate of the gate pad part and the data pad part.

FIG. 4A shows the gate electrode 121 and the gate line 116n−1 being formed at the pixel part of the substrate 110 made of a transparent insulation material such as glass, and a gate pad line 116P is formed at the gate pad part. In this case, the gate line 116n−1 denotes the previous gate line, namely, the (n−1)th gate line 116n−1, with respect to a corresponding pixel, and the gate line, the nth gate line 116n, of the corresponding pixel is also formed in the same manner as the (n−1)th gate line 116n−1.

The gate electrode 121, the (n−1)th gate line 116n−1 and the gate pad line 116P are formed by depositing a first conductive film over the entire surface of the substrate 110 and then patterning it through a photolithographic process (a first masking process).

Here, the first conductive film can be made of a suitable low-resistance opaque conductive material such as aluminum (Al), an aluminum alloy such as aluminum-neodymium (AlNd), tungsten (W), copper (Cu), chromium (Cr), molybdenum (Mo) and alloys of these materials. However, the invention is not restricted to these materials, and any suitable low-resistance opaque conductive material can be used. In addition, the gate electrode 121, the (n−1)th gate line 116n−1 and the gate pad line 116P may have a multi-layered structure in which two or more low-resistance conductive materials are stacked.

Next, as shown in FIG. 4B, a first insulation film 115A, an amorphous silicon thin film, an n+ amorphous silicon thin film and a second conductive film are sequentially deposited over the entire surface of the substrate 110, on which the gate electrode 121, the (n−1)th gate line 116n−1 and the gate pad line 116P have been formed. Then, the amorphous silicon thin film, the n+ amorphous silicon thin film and the second conductive film are selectively patterned to form an active pattern 124' formed of the amorphous silicon thin film at an upper portion of the gate electrode 121, and the source and drain electrodes 122 and 123 are simultaneously formed from the second conductive film.

An ohmic-contact layer 125' is formed of the n+ amorphous silicon thin film over the active pattern 124' and is patterned into the same shape as the source and drain electrodes 122 and 123 to make a certain region of the active pattern 124' and the source and drain electrodes 122 and 123 come into ohmic-contact with each other. In this case, a portion of the source electrode 122 crosses the nth gate line to form the mth data line 117m defining the corresponding pixel region.

A second masking process, the data pad line 117P formed of the second conductive film forms over the substrate 110 of the data pad part, and the amorphous silicon thin film pattern 124'' and the n+ amorphous silicon thin film pattern 125'' respectively formed of the amorphous silicon thin film and the n+ amorphous silicon thin film are patterned to remain at the lower portion of the data pad line 117P in the same shape as the data pad line 117P.

In this manner, in the exemplary preferred embodiment of the invention, the active pattern 124' and the source and drain electrodes 122 and 123 are simultaneously formed using a single masking process (the second masking process) by using a slit exposure (diffraction exposure, or a half-tone exposure). The second masking process will be described in detail with reference to the accompanying drawings.

FIGS. 5A to 5E show sectional views sequentially depicting the process of simultaneously forming the active pattern and the source and drain electrodes, namely, the second masking process.

Figure 5A:
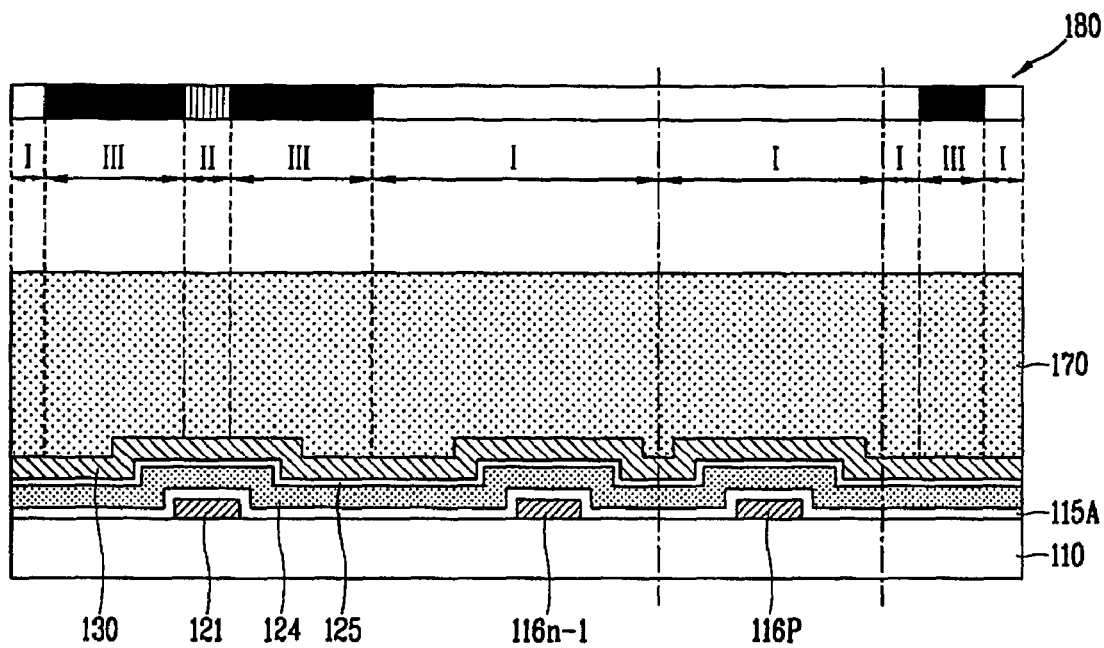
FIGS. 5A to 5E show sectional views of a second masking process in FIG. 4B.

FIG. 5A, shows the first insulation film 115A, the amorphous silicon thin film 124, the n+ amorphous silicon thin film 125 and the second conductive film 130 being deposited over the entire surface of the substrate 110 with the gate electrode 121, the (n−1)th gate line 116n−1 and the gate pad line 116P formed thereon.

Then, a photosensitive film 170 made of a photosensitive material such as a positive or negative photoresist is formed over the entire surface of the substrate, 110, and light is then selectively irradiated onto the photosensitive film 170 through a slit mask (or the half-tone mask) 180.

The slit mask 180 includes a transmission region (I) for entirely or substantially transmitting irradiated light, a slit region (II) with a slit pattern for transmitting only a portion of light and blocking a portion of light, and a blocking region (III) for entirely or substantially blocking irradiated light. Only light that has been transmitted through the slit mask 180 can be irradiated on the photosensitive film 170.

Figure 5B:
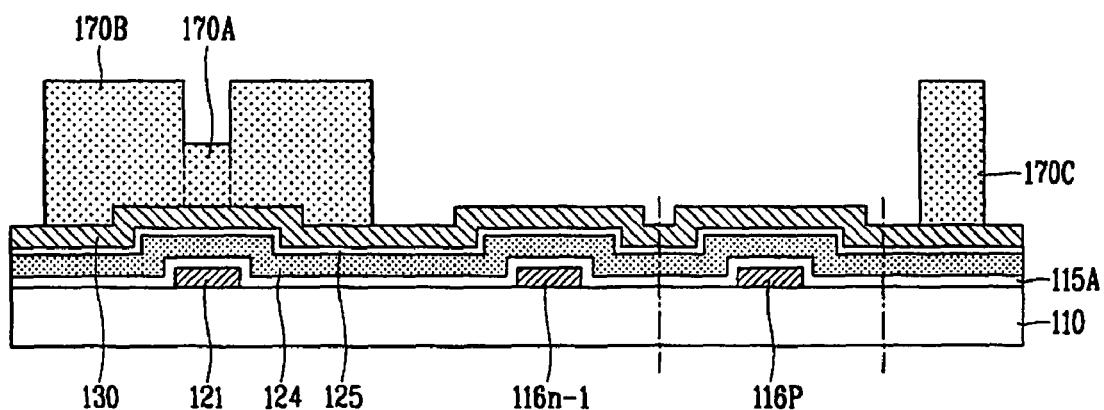

Subsequently, when the photosensitive film 170 which has been exposed through the slit mask 180 is developed, as shown in FIG. 5B, photosensitive film patterns 170A to 170C with a certain thickness remain at regions where light has been entirely or partially blocked through the blocking region (III) and the slit region (II). Also, the photosensitive film at the transmission region (I) to which light has been entirely or substantially transmitted has been completely removed to expose the surface of the second conductive film 130.

Also, the first photosensitive film pattern 170A formed using the slit region (II) is thinner than the second and third photosensitive film patterns 170B and 170C formed at the blocking region (II). Additionally, the photosensitive film at the region to which light has been entirely or substantially transmitted through the transmission region (I) is completely removed when positive photoresist is used. In this respect, however, the invention is not limited and negative photoresist can be also used.

Figure 5C:
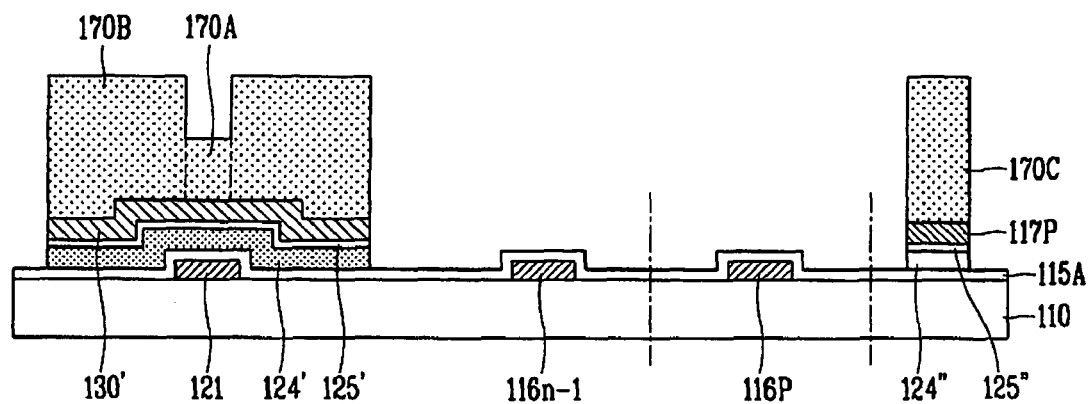

Next, as shown in FIG. 5C, the lower polycrystalline silicon thin film 124, the n+ amorphous silicon thin film 125 and the second conductive film 130 are selectively removed by using the photosensitive film patterns 170A to 170C as masks to form the active pattern 124' formed of the amorphous silicon thin film 124 at a certain region of the upper portion of the gate electrode 121. In this case, the ohmic-contact layer 125' and the second conductive film pattern 130' formed of the n+ amorphous silicon thin film 125 and the second conductive film 130, respectively, patterned in the same shape as the active pattern 124', remain at the upper portion of the active pattern 124'.

Here, the data pad line 117P formed of the second conductive film 130 forms over the substrate 110 of the data pad part, and the amorphous silicon thin film pattern 124'' and the n+ amorphous silicon thin film pattern 125'' formed of the amorphous silicon thin film 124 and the n+ amorphous silicon thin film 125 are patterned to remain in substantially the same shape as the data pad line 117P at the lower portion of the data pad line 117P.

Figure 5D:
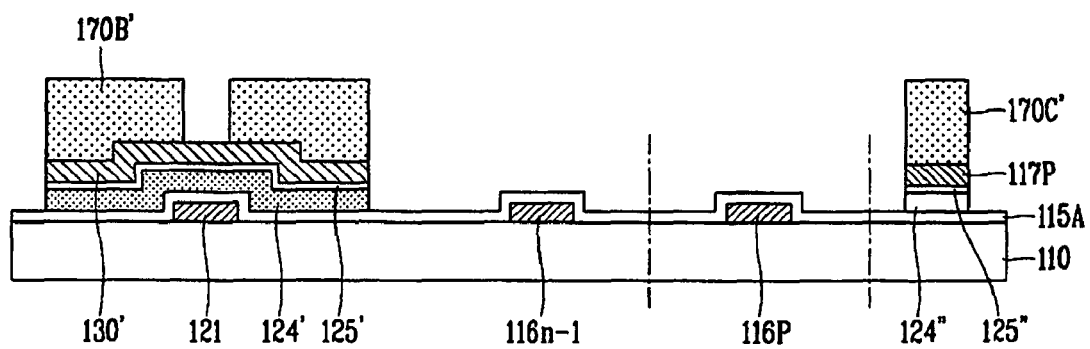

Afterwards, an ashing process removes portions of the photosensitive film patterns 170A to 170C, as shown in FIG. 5D, and the photosensitive film pattern 170A at the slit region (II) to which the slit exposure has been applied is completely removed to expose the surface of the second conductive film pattern 130'.

In this case, the second and third photosensitive film patterns 170B and 170C remain as the fourth and fifth photosensitive film patterns 170B' and 170C' with a thickness obtained by removing the thickness of the first photosensitive film pattern 170A over the certain region corresponding to the blocking region (III).

Figure 5E:
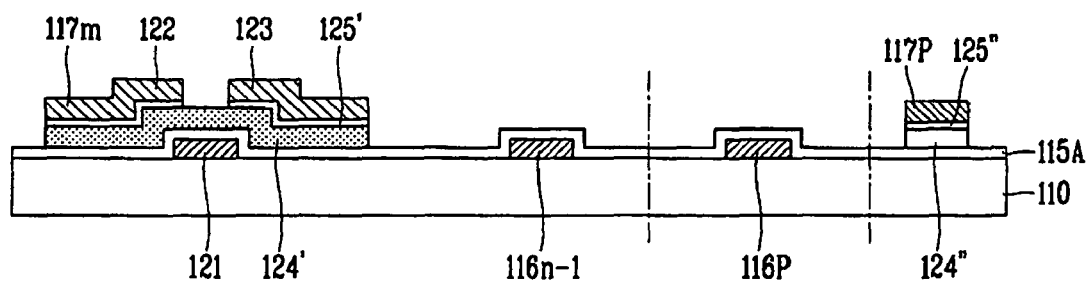

Thereafter, as shown in FIG. 5E, portions of the second conductive film pattern 130' and the ohmic-contact layer 125' at the upper portion of a certain region (specifically, the channel region of the active pattern 124') of the active pattern 124' are removed by using the remaining fourth and fifth photosensitive patterns 170B' and 170C'.

The remaining fourth and fifth photosensitive film patterns 170B' and 170C' are removed to form the active pattern 124' formed of the amorphous silicon thin film at the upper portion of the gate electrode 121 of the pixel part. At the same time, the source and drain electrodes 122 and 123 are electrically connected with a certain region (specifically, the source and drain regions formed at the left and right sides of the channel region of the active pattern 124') via the ohmic-contact layer 125'.

Then, as shown in FIG. 4C, the pixel electrode 118 electrically connected with the drain electrode 123 and gate and data pad electrodes 126P and 127P electrically connected with the gate and data pad line 116P and 117P are exposed through a single photolithographic process (a third masking process).

Here, when the second insulation film 115B is patterned through the third masking process, the photosensitive film left thin by using the slit mask or the half-tone mask at the pixel region where the pixel electrode 118 is to be formed. Thereafter, opening of the pad part exposes portions of the gate and data pad lines 116P and 117P. The photosensitive film of the pixel region is then removed through an ashing process to remove the second insulation film 115B of the pixel region.

The pixel electrode 118 is formed of a transparent conductive material at the pixel region. Gate and data pad electrodes 126P and 127P, which are electrically connected with the gate and data pad lines 116P and 117P, are formed at the pad part.

In this case, the pixel electrode 118 and the gate and data pad electrodes 126P and 127P can be formed by surface treatment of the photosensitive film and selective crystallization of the transparent conductive material such as indium-tin-oxide (ITO) without performing the masking process. The electrode formation will now be described in detail with reference to the accompanying drawings.

FIGS. 6A to 6H show sectional views depicting the third masking process in FIG. 4C.

Figure 6A:
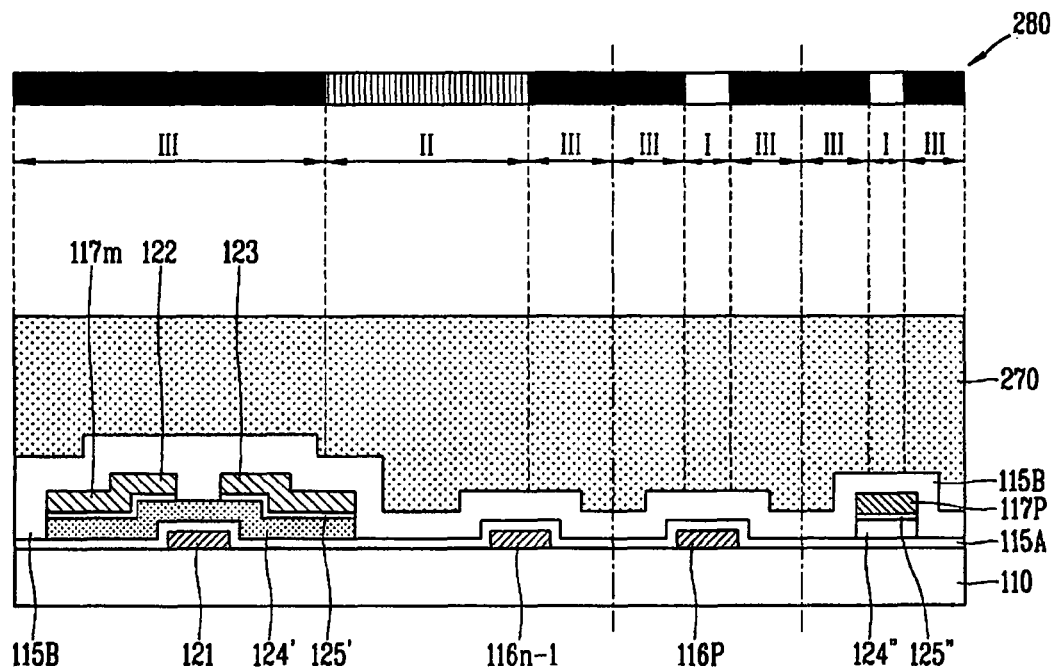
FIGS. 6A to 6H show sectional views of a third masking process in FIG. 4C.

FIG. 6A shows the second insulation film 115B and the first photosensitive film 270 made of the photosensitive material are formed over the entire surface of the substrate 110 with the active pattern 124' and the source and drain electrodes 122 and 123 formed thereon. Light is selectively irradiated to the first photosensitive film 270 through a slit mask 280.

The slit mask 280 employed for the third masking process includes a transmission region (I) for entirely or substantially transmitting irradiated light, a slit region (II) with a slit pattern for transmitting only a portion of light and blocking a portion of light, and a blocking region (III) for entirely or substantially blocking irradiated light. Only light which has transmitted through the slit mask 280 can irradiate on the photosensitive film 270.

Figure 6B:
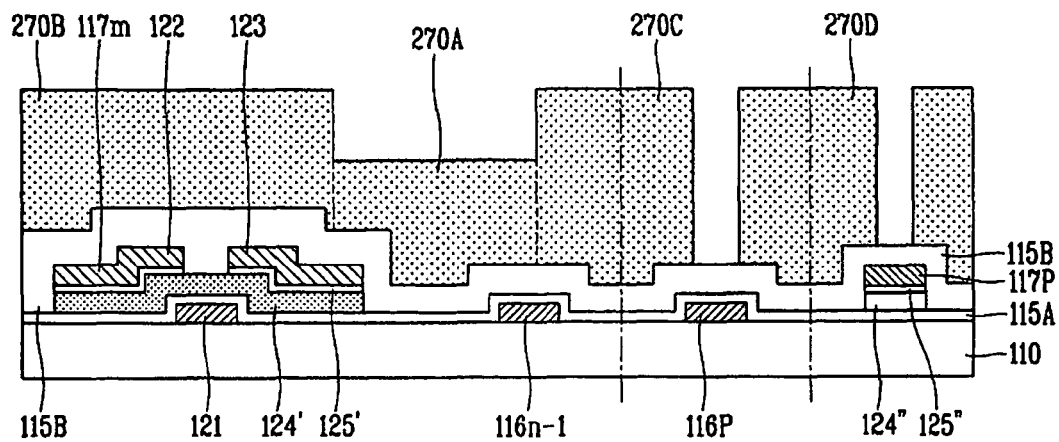

Subsequently, when the photosensitive film 270 which has been exposed through the slit mask 280 is developed, as shown in FIG. 6B, photosensitive film patterns 270A to 270D with a certain thickness remain at regions where light has been entirely or partially blocked through the blocking region (III) and the slit region (II). The first photosensitive film at the transmission region (I) to which light has been entirely or substantially transmitted has been completely removed to expose the surface of the second insulation film 115B.

At this time, the first photosensitive film pattern 270A formed through the slit region (II) is thinner than the second to fourth photosensitive film patterns 270B to 270D formed at the blocking region (III). Also, the photosensitive film at the region to which light has been entirely or substantially transmitted through the transmission region (I) is completely removed, because positive photoresist is used. In this respect, however, the invention is not limited and negative photoresist can be also used.

Figure 6C:
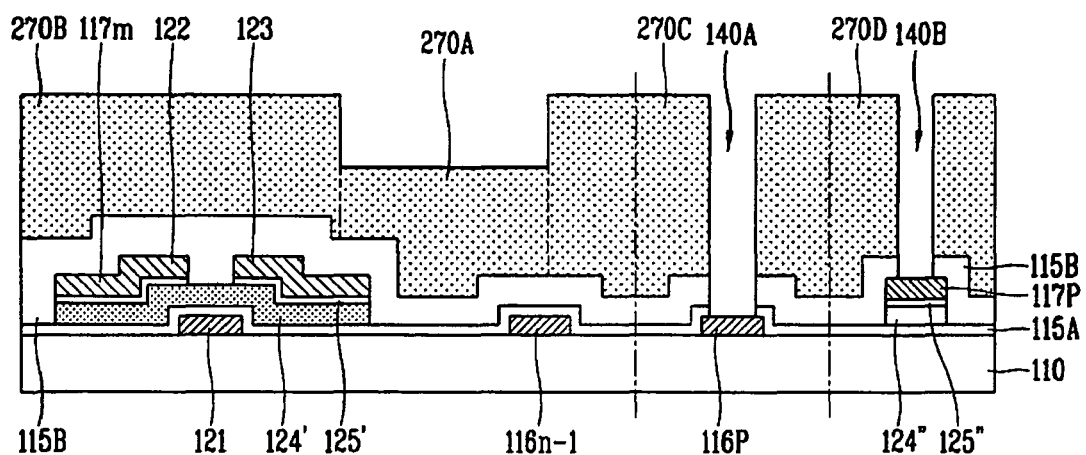

Next, as shown in FIG. 6C, the first and second insulation films 115A and 115B are selectively removed by using the photosensitive film patterns 270A to 270D as masks to form the first and second contact holes 140A and 140B to expose portions of the gate and data pad lines 116P and 117P of the pad part.

Figure 6D:
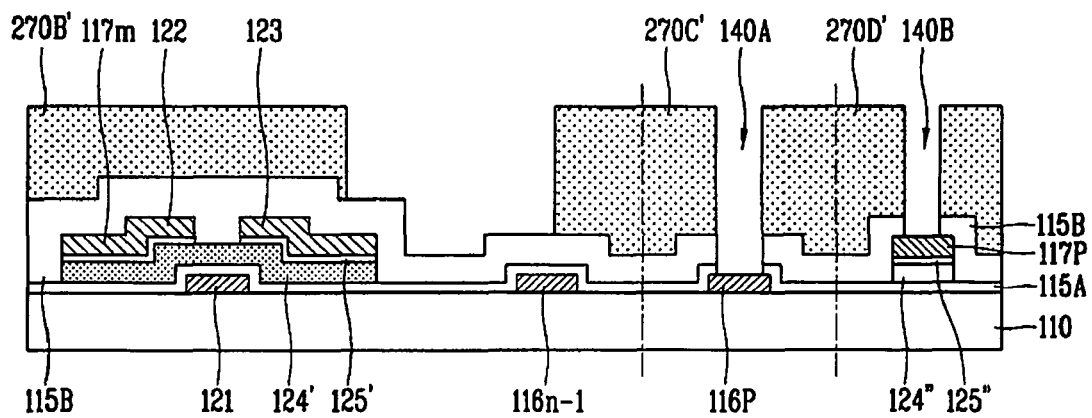

Then, when the ashing process is performed to remove portions of the photosensitive film patterns 270A to 270D, as shown in FIG. 6D, the certain region of the pixel part, i.e., the first photosensitive film pattern 270A at the slit region (II), to which the slit exposure has been applied is completely removed to expose the surface of the second insulation film 115B.

In this case, the second to fourth photosensitive film patterns 270B to 270D remain as the fifth to seventh photosensitive film patterns 270B' to 270D' with a thickness obtained by removing the thickness of the first photosensitive film pattern 270A on the certain region corresponding to the blocking region (III).

Figure 6E:
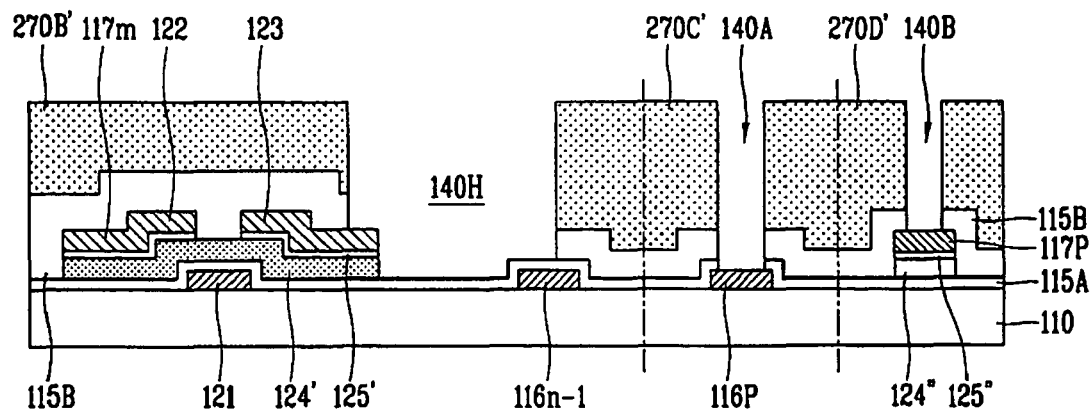

Thereafter, as shown in FIG. 6E, the second insulation film 115B of the pixel part is removed by using the fifth to seventh photosensitive film patterns 270B' to 270D' as masks. Then, the second insulation film 115B of the certain region on the drain electrode 123 of the pixel part is removed to expose a portion of the drain electrode 123.

Figure 6F:
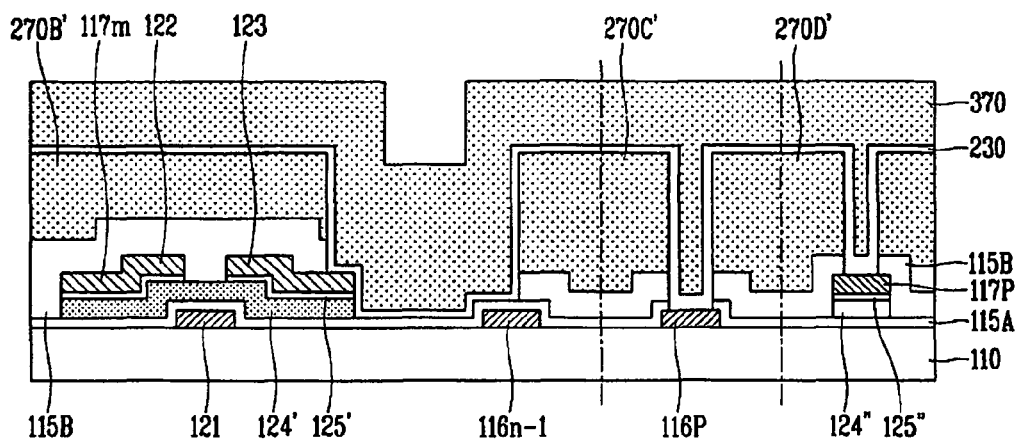

Then, as shown in FIG. 6F, a third conductive film 230 is formed with a transparent conductive material over the entire surface of the substrate 110 on which the fifth to seventh photosensitive film patterns 270B' to 270D' remain.

In order to form the pixel electrode and the pad part electrode, the third conductive film 230 is made of the conductive material with excellent transmittance such as indium-tin-oxide (ITO) or indium-zinc-oxide (IZO). In this case, before depositing the ITO thin film 230, plasma or heat treatment can be performed to proceed with a process for making the surfaces of the photosensitive film patterns 270B' to 270D' hydrophobic. The surface of the ITO or IZO thin film 230 is hydrophilic, so the interface conditions between the ITO thin film 230 and the photosensitive film patterns 270B' to 270D' can deteriorate by making the surfaces of the photosensitive film patterns 270B' to 270D' hydrophobic to thus selectively remove the ITO or IZO thin film 230 that contacts with the photosensitive film patterns 270B' to 270D'.

Figure 6G:
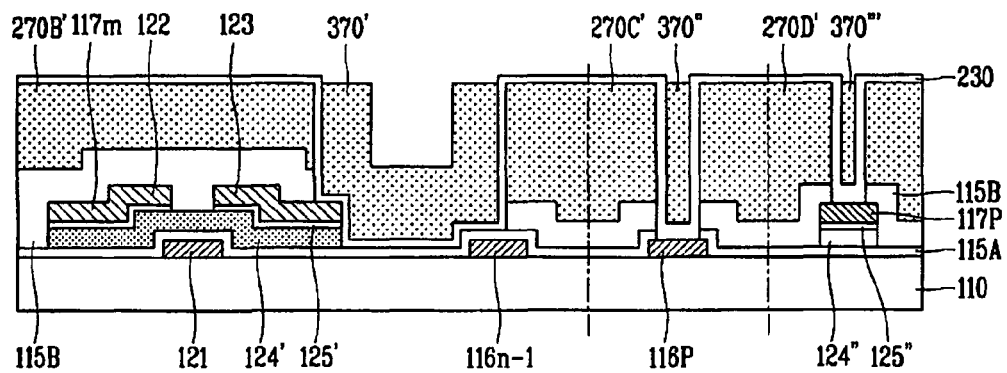

Thereafter, as shown in FIG. 6G, the ashing process for removing a portion of the second photosensitive film 370 is performed to allow the ITO or IZO thin film 230 to be exposed at regions other than the pixel region and the first and second contact hole regions of the pad part. In this case, the eighth to tenth photosensitive film patterns 370' to 370''' whose thickness has been partially removed through the ashing process remain only at the upper portion of the pixel region and the first and second contact hole regions of the pad part.

Then, the ITO or IZO thin film 230 is crystallized by heat-treating at a temperature of about 80° C. to about 250°

C., preferably about 100° C. to about 200° C. Then, only the ITO or IZO thin film 230 positioned on the upper surface of the first insulation film 115A, the exposed drain electrode 123 and the exposed pad part lines 116P and 117P is selectively crystallized. This is because the ITO or IZO thin film 230 that contacts with the photosensitive film patterns 270B' to 270D' and the ITO or IZO thin film 230 that contacts with the first insulation 115A, the exposed drain electrode 123 and the exposed pad part lines 116P and 117P (other than the photosensitive film patterns 270B' to 270D') have mutually different interface states. Crystallization of the ITO or IZO thin film 230 that contacts the photosensitive film patterns 270B' to 270D' is disrupted by an element such as carbon existing in the photosensitive film patterns 270B' to 270D'.

Figure 6H:
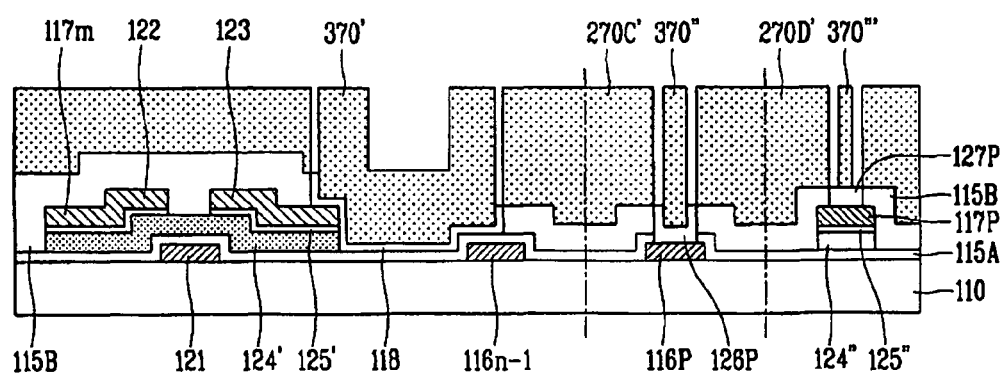

Then, as shown in FIG. 6H, only the ITO or IZO thin film 230 in the exposed amorphous state is selectively removed to simultaneously form the pixel electrode 118 of the pixel region and the gate and data pad electrodes 126P and 127P at the first and second contact hole regions of the pad part.

The gate pad electrode 126P is electrically connected with the gate pad line 116P, and the data pad electrode 127P is electrically connected with the data pad line 117P.

The pixel electrode 118 is electrically connected with a portion of the drain electrode 123, and in this case, the drain electrode 123 is electrically connected directly with the pixel electrode 118 without using a contact hole. However, a contact hole can be used in an alternative embodiment of the invention.

A portion of the corresponding pixel electrode 118 is formed to overlap with a portion of the previous gate line 116n-1 to form a storage capacitor (Cst in FIG. 3) together with the previous gate line 116n-1 with the first insulation film 115A interposed between this geometry.

In this embodiment of the invention, as the channel layer, the amorphous silicon TFT using an amorphous silicon thin film is used as an example. However, the invention is not limited thereto, and a polycrystalline silicon TFT using a polycrystalline silicon thin film can be also used as the channel layer.

The invention can be also applied to a different display devices having TFTs, for example, an OLED (Organic Light Emitting Diode) display device in which OLEDs are connected with driving transistors.

As the invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for fabricating a liquid crystal display (LCD) device comprising:
   providing a first substrate divided into a pixel part and a pad part;
   forming a gate electrode and a gate line at the pixel part of the first substrate and a gate pad line at the pad part of the first substrate through a first masking process;
   forming a first insulation film over the first substrate;
   forming an active pattern and source and drain electrodes at an upper portion of the gate electrode of the pixel part and a data pad line at the pad part, and forming a data line substantially crossing the gate line to define a pixel region through a second masking process;
   forming a second insulation film and a first photosensitive film over the first substrate with the active pattern and the source and drain electrodes formed thereon;
   exposing and developing the first photosensitive film to form a first photosensitive film pattern with a first thickness at a first region of the pixel part and to form second to fourth photosensitive film patterns with a second thickness at a second region excluding the first region and a certain region of an upper portion of the gate/data pad lines of the pad part;
   selectively removing the first and second insulation films by using the first to fourth photosensitive film patterns as a mask to form a first contact hole exposing a certain region of the gate pad line and a second contact hole exposing a certain region of the data pad line;
   simultaneously removing the first photosensitive film pattern and a portion of the second to fourth photosensitive film pattern to form fifth to seventh photosensitive film patterns with a third thickness;
   selectively removing the second insulation film of the first region by using the fifth to seventh photosensitive film patterns as a mask to expose a portion of the drain electrode;
   forming a third conductive film made of a transparent conductive material over the first substrate on which the fifth to seventh photosensitive film patterns remain;
   forming a second photosensitive film over the first substrate;
   removing a portion of the second photosensitive film to expose the third conductive film of the second region; and
   selectively removing the exposed third conductive film to form a pixel electrode electrically connected directly with the exposed drain electrode at the first region of the pixel part on the first insulation film, a gate pad electrode electrically connected with the gate pad line via the first contact hole at the pad part, and a data pad electrode electrically connected with the data pad line via the second contact hole; and
   attaching the first substrate and a second substrate.

2. The method of claim 1, wherein the forming of the active pattern and the source and drain electrodes comprises:
   forming a first insulation film, an amorphous silicon thin film, a n+ amorphous silicon thin film and a second conductive film over the first substrate;
   forming a first photosensitive film pattern with a first thickness at a first region of an upper portion of the gate electrode;
   forming a second photosensitive film pattern with a second thickness at second regions positioned at left and right sides of the first region;
   selectively removing the amorphous silicon thin film, the n+ amorphous silicon thin film and the second conductive film by using the first and second photosensitive film patterns as a mask to form an active pattern formed of the amorphous silicon thin film at the first and second regions, and forming an ohmic-contact layer and a first conductive film pattern formed of the n+ amorphous silicon thin film and the second conductive film over the active pattern and patterned in the same shape as the active pattern;
   simultaneously removing the first photosensitive film pattern and a portion of the second photosensitive film pattern to form a fourth photosensitive film pattern with a third thickness; and
   removing the n+ amorphous silicon thin film and the second conductive film at an upper portion of the active pattern of the first region by using the fourth photosensitive film pattern as a mask to form source and drain electrodes electrically connected with certain regions of the active pattern via the ohmic-contact layer.

3. The method of claim 2, further comprising:
forming a third photosensitive film pattern with a second thickness at a third region of the pad part.

4. The method of claim 3, further comprising:
forming a data pad line formed of the second conductive film at the third region by selectively removing the amorphous silicon thin film, the n+ amorphous silicon thin film and the second conductive film by using the third photosensitive film pattern as a mask.

5. The method of claim 4, wherein an amorphous silicon thin film pattern and an n+ amorphous silicon thin film pattern which have been patterned in the same shape as the data pad line are formed of the amorphous silicon thin film and the n+ amorphous silicon thin film at a lower portion of the data pad line.

6. The method of claim 2, wherein the forming of the first and second photosensitive film patterns comprises:
forming a photosensitive film over the first conductive film;
irradiating light onto the photosensitive film through a slit mask or a half-tone mask having a first transmission region for transmitting entire light, a second transmission region for transmitting only a portion of light and a blocking region for blocking light; and
developing the photosensitive film to which light has been irradiated through the slit mask or the half-tone mask to form a photosensitive film pattern over the first conductive film such that the first photosensitive film pattern with the first thickness is formed at the first region of the upper portion of the gate electrode and the second photosensitive film pattern with the second thickness is formed at the second regions positioned at the left and right sides of the first region.

7. The method of claim 6, wherein the photosensitive film is a positive photosensitive film, the second transmission region of the slit mask or the half-tone mask is applied to the first region of the active pattern, and the blocking region is applied to the second region of the active pattern.

8. The method of claim 6, wherein the slit mask or the half-tone mask includes a slit pattern at the second transmission region for transmitting only a portion of light in order to form the first photosensitive film pattern with the first thickness on the first region smaller than the second thickness on the second region of the active pattern.

9. The method of claim 2, wherein the first region of the active pattern comprises a channel region and the second region comprises source and drain regions.

10. The method of claim 1, wherein the third conductive film is made of a transparent conductive material comprising indium-tin-oxide (ITO) or indium-zinc-oxide (IZO).

11. The method of claim 1, wherein plasma treatment or heat treatment is performed before depositing the third conductive film to make a surface of the fifth photosensitive film pattern hydrophobic.

12. The method of claim 1, wherein after forming the second photosensitive film, it is thermally treated at temperature of about 100° C. to 200° C. to selectively crystallize only the third conductive film positioned at the first region, the first contact hole region and the second contact hole region.

* * * * *